B. HALTERMAN.
POTATO SORTER.
APPLICATION FILED JULY 31, 1912.

1,067,980.

Patented July 22, 1913.

Witnesses:

Inventor,
B. Halterman.

Attorneys

UNITED STATES PATENT OFFICE.

BERT HALTERMAN, OF GLYNDON, MINNESOTA.

POTATO-SORTER.

1,067,980.  Specification of Letters Patent.  Patented July 22, 1913.

Application filed July 31, 1912. Serial No. 712,532.

*To all whom it may concern:*

Be it known that I, BERT HALTERMAN, a citizen of the United States, residing at Glyndon, in the county of Clay, State of Minnesota, have invented certain new and useful Improvements in Potato-Sorters; and I do hereby declare the following to be a full, clear, and exact description of the invention, such as will enable others skilled in the art to which it appertains to make and use the same.

This invention relates to machines particularly adapted for sorting potatoes and the like.

The invention has for its object to construct a machine in a simple manner, which when operated will grade the material acted upon in an efficient manner.

With these and other objects in view, the invention consists in certain novel features of construction, combination and arrangement of parts as will be hereinafter fully described and claimed.

Figure 1:
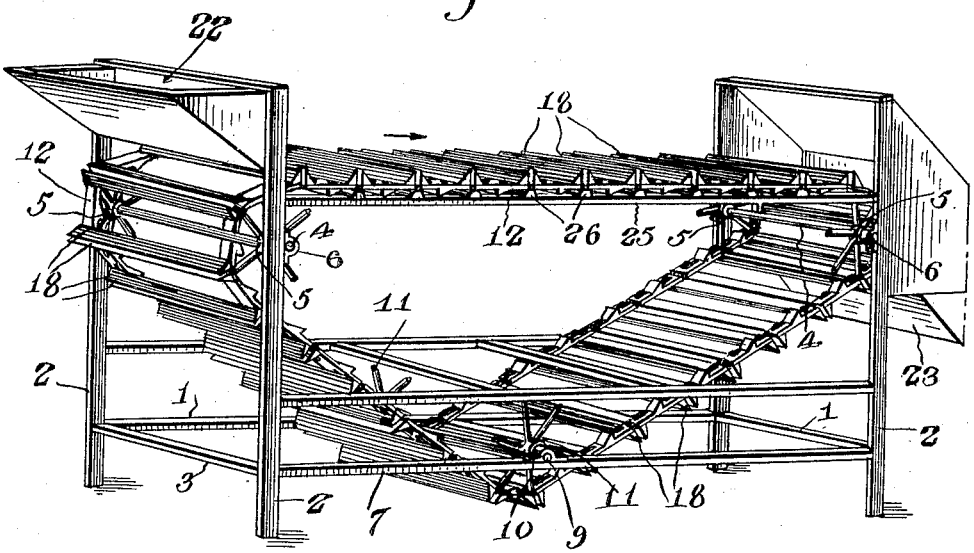
Figure 2:
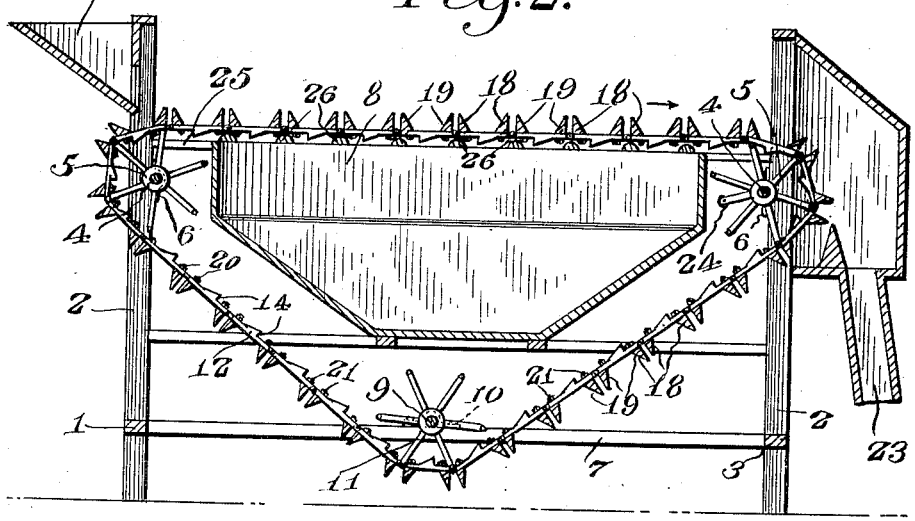
Figure 3:
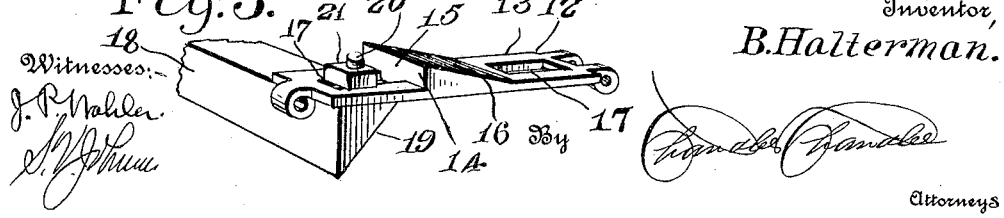

In the drawing: Figure 1 is a perspective view of the machine. Fig. 2 is a longitudinal sectional view. Fig. 3 is a detailed perspective view of one of the links.

Referring to the drawing, the numeral 1 designates a frame the same consisting of vertical uprights 2, which are held in their proper spaced relation by transverse braces 3.

Shafts 4 are journaled in each end of the frame, and have keyed thereto a pair of spaced sprocket wheels 5. The shafts 4 are revolubly mounted in suitable journal boxes 6, the same being supported upon the vertical uprights 2 forming the end sections of the frame 1.

Extending longitudinally of the frame 1 are brace bars 7, said brace bars being adapted to support a receiving box 8, and into which the smaller potatoes are projected during the sorting process.

Extending transversely of the brace bars 7 is a revolubly mounted shaft 9, said shaft being supported in suitable boxings 10. Keyed to the shaft 9, and spaced apart are sprocket wheels 11, and around which pass the sorting belts 12, said belts being also passed around the sprockets 5, hereinbefore mentioned.

The belts 12 consist of a plurality of jointed links 13, each link consisting of a central solid portion 14, the upper surface of which is flat, while the lower surface is formed with a projection 15, the under surface of which being beveled as at 16, the purpose of which will appear later.

Formed upon each side of the central portion 14 of each link are longitudinal slots 17, the purpose of which being to adjustably secure the opposite ends of the transversely arranged bars 18. The bars 18 are substantially triangular in cross section and are arranged so that their inclined faces 19 will be confronting, as clearly shown in Fig. 2 of the drawing.

To adjustably connect the bars 18 to the links 13, bolts 20 are passed through suitable openings formed therein said bolts being adapted to engage the slots 17 of the links, so that upon manipulation of the clamping nuts 21, said bars may be moved toward or away from each other to suit different conditions.

Mounted upon the frame 1 is a receiving hopper 22, and into which the potatoes or the like are placed, said hopper having its outlet opening directly upon the separating belts, so that the material contained therein will pass upon the same. Upon the opposite end of the frame is mounted a discharge chute 23, and upon which pass the potatoes which were too large to fall between the bars 18.

Secured to one end of the shaft 4, which is located at the discharging end of the frame is a crank 24, which when operated will revolve the sprockets 5 and cause the chain belts to travel in the direction of the arrow.

Extending longitudinally of the frame 1, and directly under each of the belts 13 is a track-way 25, the upper surface of which being provided with a series of off-sets or shoulders 26, which engage the beveled projections 15 of the links during the travel of the chains, thus imparting thereto sufficient vibration to jar the material being separated to cause the proper sorting of the same. From this construction it will be seen that upon travel of the belts 12 and their connected parts, the same will be vibrated due to the peculiar formation of the links forming the chains and upon their engagement with the track-ways 25.

It is obvious that a belt pulley or the like may be substituted for the crank 24 to operate the machine by a suitable motor.

What is claimed is:

A sorting machine comprising a frame, track-ways extending longitudinally thereof and having off-sets formed upon their upper faces, sprocket wheels carried by the frame, endless belts passing around said sprocket wheels, said belts consisting of a plurality of jointed links, a plurality of transversely arranged bars having their ends adjustably secured to the links, beveled projections formed upon said links adapted to engage the off-sets of the track-ways whereby vibration is imparted to the belts during their travel.

In testimony whereof, I affix my signature, in presence of two witnesses.

BERT HALTERMAN.

Witnesses:
  NORMAN H. STAELUM,
  O. C. HEYS.

Copies of this patent may be obtained for five cents each, by addressing the "Commissioner of Patents, Washington, D. C."